July 6, 1926.
V. W. SHUTT
SNUBBER
Filed March 5, 1923
1,591,687
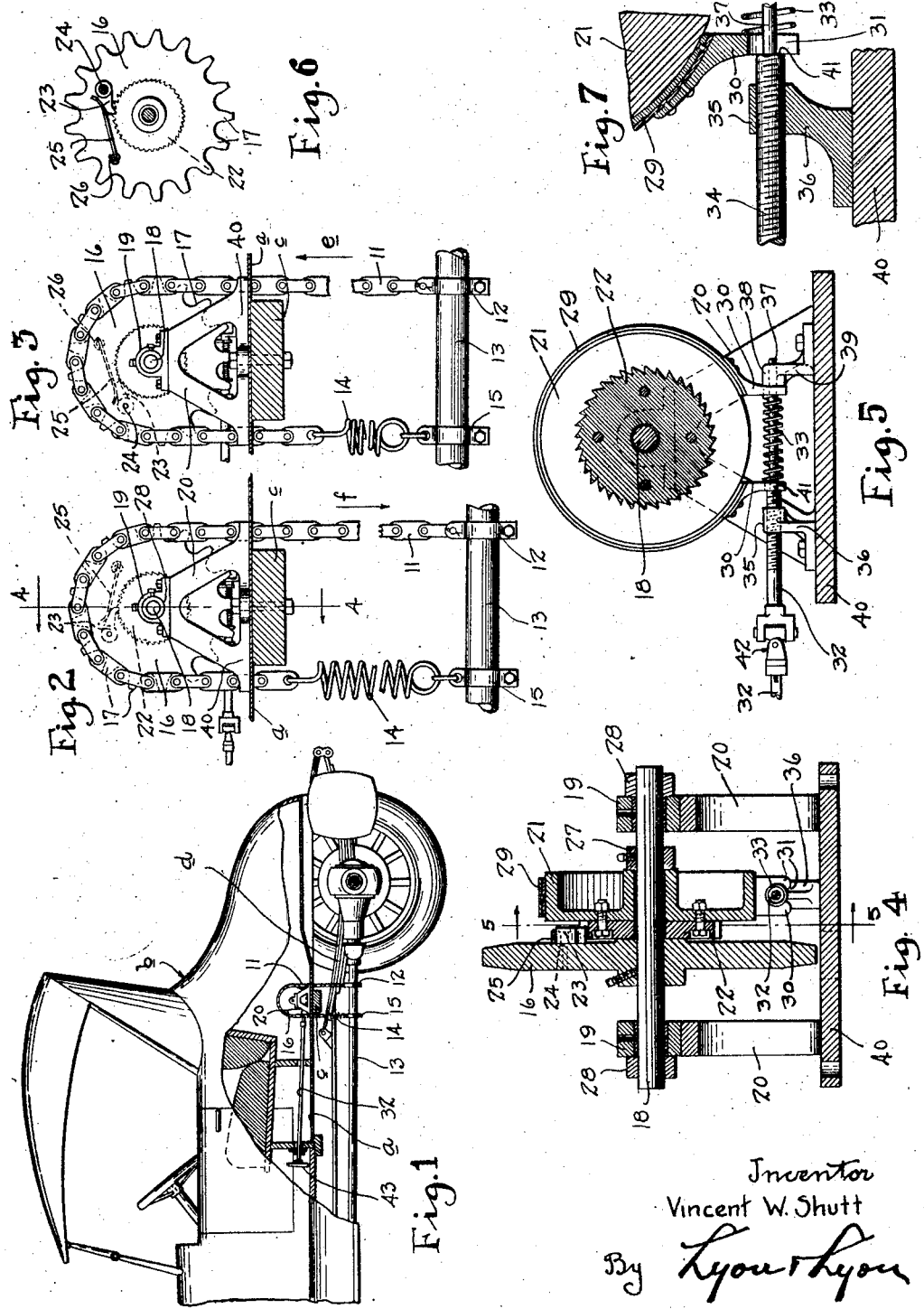
Inventor
Vincent W. Shutt
By Lyon & Lyon
Attys.

Patented July 6, 1926.

1,591,687

UNITED STATES PATENT OFFICE.

VINCENT W. SHUTT, OF SANTA MONICA, CALIFORNIA.

SNUBBER.

Application filed March 5, 1923. Serial No. 622,856.

This invention relates to snubbers of the type employed in checking the rebound of the springs of vehicles. An object of this invention is to provide simple and effective means for checking the rebound of vehicle springs, after they have been compressed by shock.

Another object is to make provision for adjusting the snubber, for different load and road conditions, from the driver's seat.

The accompanying drawings illustrate the invention:

Figure 1 is a fragmental side elevation of a motor vehicle equipped with a snubber embodying the invention, a portion of the vehicle body being shown in section and the near rear wheel being omitted.

Fig. 2 is an enlarged broken side elevation of the snubber, a fragment of the vehicle body being shown in section. The parts are positioned as when the vehicle springs are expanding.

Fig. 3 is a side elevation similar to Figure 2, excepting that the parts are in the positions they occupy when the vehicle springs are being compressed by a shock.

Fig. 4 is an enlarged sectional elevation on the line indicated by 4—4, Figure 2.

Fig. 5 is an elevation, partly in section, from the line indicated by 5—5, Figure 4.

Fig. 6 is a face view of the sprocket wheel showing the pawl, ratchet wheel and the pawl-operating spring.

Fig. 7 is an enlarged fragmental sectional detail of the left lower portion of Figure 5.

It is to be understood that the snubbers may be connected, as desired, between any suitable points of the two members that are to be checked against relative movement. If such members are a vehicle body and chassis, there may be a snubber provided for each of the vehicle springs or a single snubber may be used at a point midway between each set of springs. In the instance illustrated, the snubber is connected with the vehicle body along the longitudinal mid line thereof and with the housing of the propeller shaft, but this method of connection is merely shown for the purpose of explaining how the invention operates since, as stated above, the snubbers may be provided in any desired number and connected at any suitable point with the vehicle body and chassis.

The snubber is provided with a flexible driving member 11 that, in this instance, is connected at one end by a suitable split clamping collar 12 with the housing 13 through which extends the propeller shaft, not shown, of the vehicle. The other end of the driving member 11 is connected with an automatic slack take-up device, which, in this instance, is a coil spring 14 that is connected by suitable clamping means 15 to the shaft housing 13. Any other suitable slack take-up device may be used within the scope of the appended claim.

The driving member 11 may be a cable or chain and, in the drawings, is illustrated as being a sprocket chain. Such sprocket chain is preferred since it avoids slippage between it and the driven member which is shown at 16.

There are provided means operatable by movement of the driving member in one direction only to yieldingly resist such movement. While any suitable means may be provided for producing such resistance, only one form of such means is illustrated and the resistance is produced by frictional contact between two relatively moving members.

In this instance the driven member 16 is in the form of a sprocket wheel having teeth 17 engaged by the driving member. The driven member 16 is rotatably mounted on the vehicle body in any suitable manner. In this particular instance the mounting is effected by keying or otherwise securing the driven member 16 to a shaft 18 journaled in bearings 19. The bearings 19 are supported on standards 20 rising from a base 40 mounted on the floor $a$ of the vehicle, which is indicated in general by the character $b$. Preferably the base 40 is mounted immediately over one of the cross members $c$ of the frame of the vehicle body. Loosely mounted on the shaft 18 is a friction member 21 in the form of a brake drum. Means are provided, operatable by rotation of the sprocket wheel 16 in one direction only to rotate the brake drum 21, said means being inoperative to rotate the brake drum when the sprocket wheel is driven in the opposite direction. These means may be of any suitable construction and, in this instance, are as follows:

Bolted or otherwise secured to one end of the drum 21 is a ratchet wheel 22 engaged by a pawl 23 pivoted at 24 to the sprocket wheel 16. The pawl 23 is held yieldingly in engagement with the teeth of the ratchet wheel 22 by a suitable spring 25 fixed at one end at 26 to the sprocket wheel. The shaft 18 is provided with a collar 27 to prevent the brake drum 21 from movement away from the sprocket wheel 16, said sprocket wheel abutting the ratchet wheel and thus preventing movement of the drum toward the sprocket wheel. The shaft 18 is provided with other collars 28 to prevent endwise motion of the shaft in its bearings.

The brake drum 21 is provided with a friction member 29 in the form of a brake band which partially surrounds the drum. The opposite ends of the band are provided with ears 30 having openings 31 through which extends a rod 32. Surrounding the rod between the ears 30 is a coil spring 33 which tends to spread the ends of the brake band to diminish the friction between it and the brake drum. The rod 32 is provided with screw-threads 34 which engage a nut 35 on the upper end of a standard 36. An unthreaded portion 37 of the rod is journaled in a bearing 38 on the upper end of a standard 39. In this instance the standards 36, 39 are mounted on the base 40 and are positioned between the standards 20. The portion 37 of the rod 32 is of less diameter than the threaded portion 34 so as to define a shoulder 41 that bears against one of the ears 30, the other ear being held against movement away from the first ear by the bearing 38. Thus when the rod 32 is turned to screw it to the right in Figure 5, the ear 30 on the left is forced toward the ear 30 on the right, thus tightening the band on the drum. Turning the rod 32 in the opposite direction will, of course, loosen the band. The rod 32 is preferably in sections as shown, the sections being connected by a universal joint 42. The rod 32 extends to the vicinity of the driver's seat and is provided with a knob 43 whereby said rod may be readily turned to adjust the tension of the brake band on the drum.

The invention operates as follows: Assuming, for example, that the rear wheels of the vehicle hit an obstruction or the bottom of a depression in the road, the vehicle springs, one of which is indicated at $d$, will be compressed in the usual manner. When the snubber is installed the spring 14 will be under tension at the times that the vehicle springs are normal. Thus, it will be clear, that when the vehicle springs are compressed, as stated above, the spring 14 will contract to pull the driving member 11 in the direction of the arrow $e$, Fig. 3, so as to rotate the driven member 16. The pawl 23 and the teeth of the ratchet wheel are so arranged that, when the driving member 11 is thus pulled, the pawl slips over the ratchet teeth and, consequently, the drum 21 is not driven.

After the vehicle springs have been compressed, they expand and, if no provision were made to prevent it, the springs would rebound past their normal position thus throwing the body of the vehicle and the persons seated therein. When, however, the vehicle springs begin to expand, the vehicle body and shaft housing 13 separate, thus pulling the driving member 11 in the direction of the arrow $f$, Fig. 2, against the tension of the spring 14, turning the sprocket wheel in a direction that will cause the pawl to rotate the ratchet wheel. This, of course, turns the drum 21. Thus the pull of the member 11 in the direction of the arrow $f$ in Figure 2 is against whatever degree of friction exists between the drum 21 and band 29. This friction yieldingly resists expansion of the vehicle springs, thus preventing said vehicle springs from expanding beyond their normal positions. Thus, rebound of the vehicle springs is snubbed, as it is usually expressed.

When the vehicle is being driven along a comparatively smooth boulevard, comparatively free rebound action of the vehicle springs may be desirable to provide for the utmost ease in riding and the band will be loosened accordingly. If, however, the vehicle should be driven from such boulevard onto a comparatively rough stretch of road, it would be desirable to increase the resistance to expansion of the vehicle springs, and this the driver can effect by turning the knob 43 in a direction to increase the tension of the brake band upon the drum. Because of this novel adjustment feature of the snubber, it is clear that the snubber can be adjusted for any conditions of load or road surface while the loaded vehicle is moving. This, of course, is a great advantage.

I am aware that friction means have been heretofore employed for snubbing the spring action, and I do not broadly claim such means. One of the novel features of the invention is the flexible driving member in combination with slack take up means and means operatable by movement of the driving member in one direction only to yieldingly resist such movement. Another novel feature is the adjusting means reaching to a point adjacent the driver's seat for regulation of the resistance while the loaded vehicle is traveling. Another novel feature is the special construction of the friction-producing means.

I claim:

A snubber for vehicles comprising a shaft, means to rotatably support the shaft on one of the vehicle members that are to be checked against movement, a sprocket wheel fixed to said shaft, a sprocket chain engaging the sprocket wheel and having one end connected with the other of said vehicle members, slack take-up means yieldingly connected with the other end of the sprocket chain and adapted for connection with said other vehicle member, a brake drum mounted on the shaft, a brake shoe frictionally engaging the drum, and pawl and ratchet means between the sprocket wheel and brake drum operating to permit free rotation of the sprocket wheel when said vehicle members approach and operating to connect the sprocket wheel with the brake drum when said vehicle members separate.

Signed at Los Angeles, Calif., this 24th day of February, 1923.

VINCENT W. SHUTT.